Dec. 19, 1944.                C. E. STRODE                2,365,155
                    AIR BRAKE SYSTEM FOR RAILROAD CARS
                    Filed Dec. 10, 1942         2 Sheets-Sheet 1
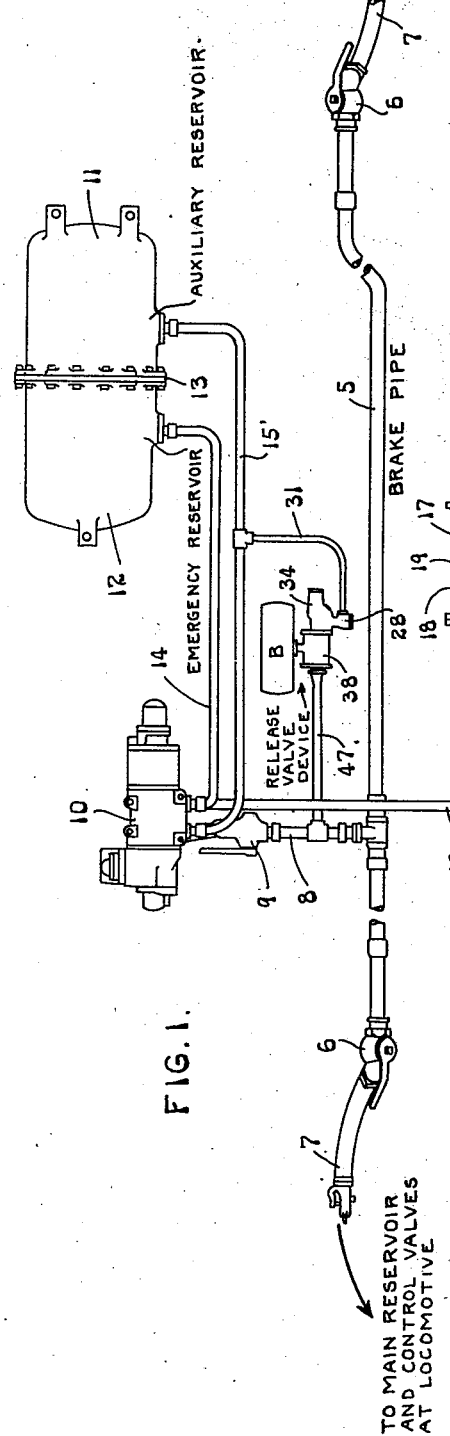
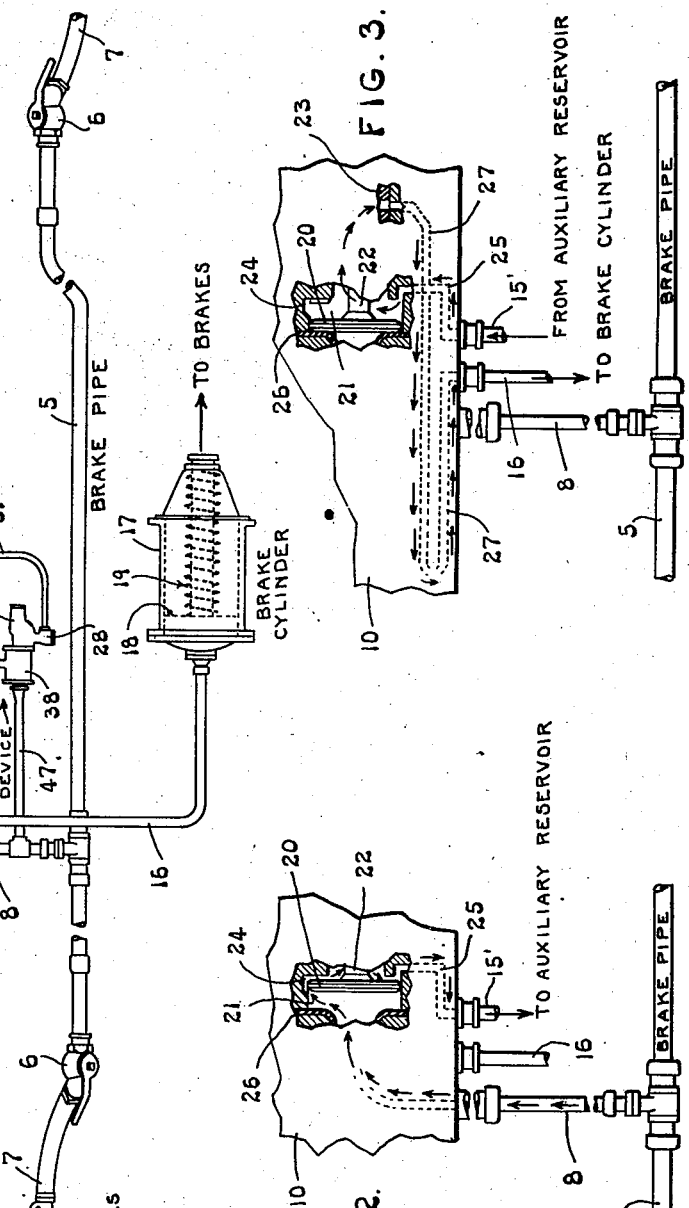
INVENTOR.
C. E. STRODE
BY Albert J. McCauley
ATTORNEY.

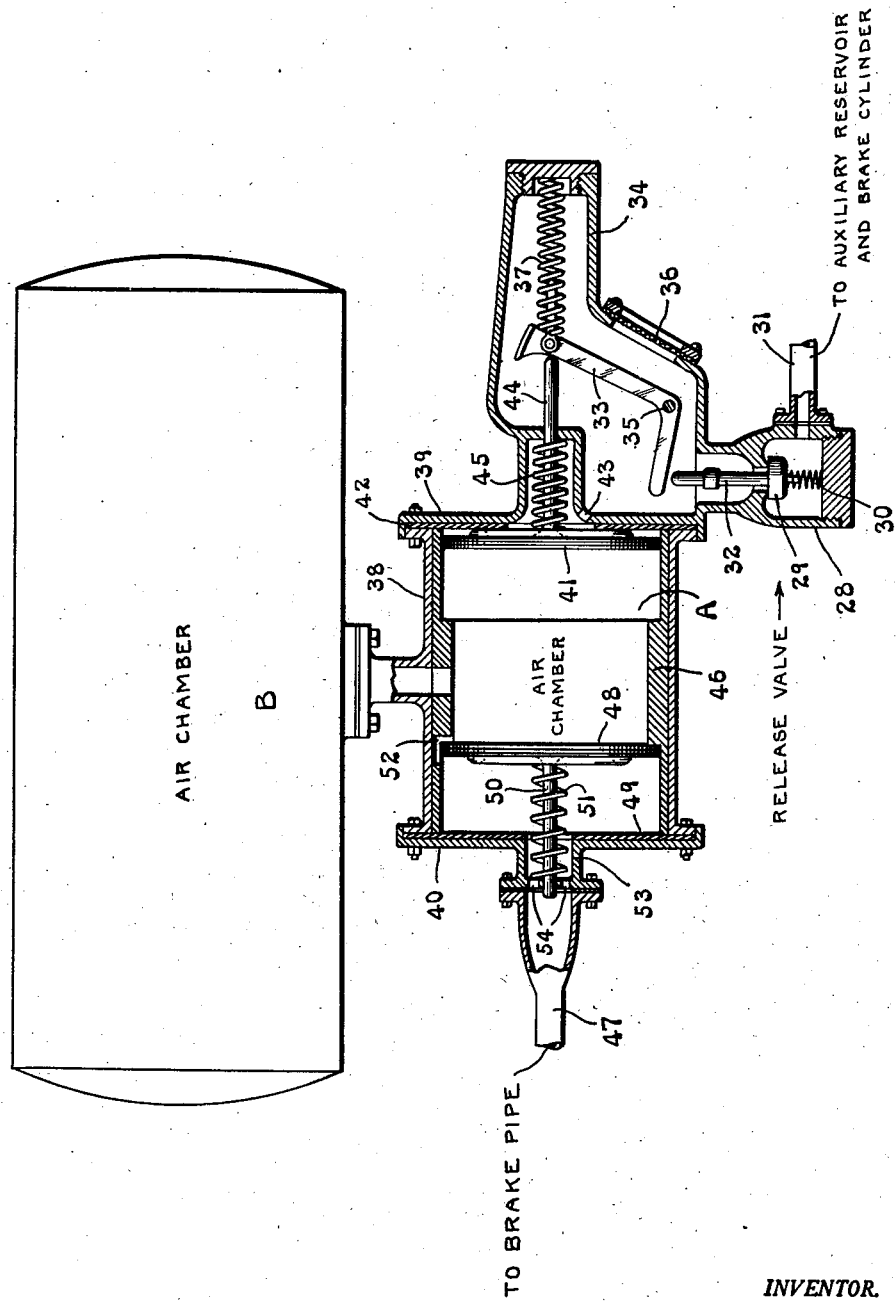

Patented Dec. 19, 1944

2,365,155

UNITED STATES PATENT OFFICE 2,365,155

AIR BRAKE SYSTEM FOR RAILROAD CARS

Charles E. Strode, Osawatomie, Kans.

Application December 10, 1942, Serial No. 468,597

11 Claims. (Cl. 303—70)

This invention relates to air brake systems for railroad cars, and more particularly to an automatic release valve device adapted to release the brakes without requiring any special attention of a switchman or other operator.

For more than thirty years, the standard air brake equipment generally accepted as most desirable for railroad cars has included a release valve to be manually operated after a car is disconnected from a locomotive, so as to release the brakes before the car is again placed in motion.

In actual practice, this manual release of the brakes at a series of cars is a rather haphazard operation which may or may not be properly performed, and it involves attention of persons who may fail to release all of the brakes. This failure would result in the destructive effects of starting a train of cars wherein the brakes are firmly applied to one or more of the cars.

Aside from the probability of a failure in the special attention required for manual release of the brakes at an idle car, the modern standard air brake equipment includes an emergency air reservoir having real advantages which are often reduced by the usual manual release of the brakes. For example, the switchman, or other operator, is faced with a simple operating member which may be moved to one position to merely exhaust the compressed air from an auxiliary reservoir, thereby merely releasing the brakes, or to another position which idly eliminates the air pressure from the emergency air reservoir. My own personal experience in this art has clearly shown that the usual operator is likely to completely discharge all of the compressed air from the modern special emergency reservoirs, thereby idly wasting compressed air which was deliberately stored for subsequent operations.

In other words, expert development of air brake systems, extending over a period of more than fifty years, has failed to solve the foregoing problems. I am personally familiar with average working conditions wherein brakes are not released before cars are placed in motion, as well as the ordinary manual operations of release valves, which are likely to idly discharge compressed air from emergency reservoirs.

Careful study of the modern air brake systems as developed by experts in this old art has shown another very objectionable condition which arises from excess pressure in the auxiliary reservoirs.

This excess pressure in an auxiliary reservoir is a serious condition which may arise from an unexpected defect in a reducing valve intended to maintain a predetermined normal pressure in the brake pipe, or to an increase in pressure deliberately employed by the engineer to release the brakes at one or more of the cars.

To understand this problem of excess pressure in auxiliary reservoirs, one should bear in mind that the generally accepted standard air brake equipment includes an arrangement of automatic valves, commonly termed a "triple valve," or an "A B" valve, designed to energize the brakes when the air pressure in a "brake pipe" is lower than the pressure in the auxiliary reservoir. However, the details of this usual triple valve (or its equivalent) are so arranged that the undesirable high pressure in the auxiliary reservoir will forcibly apply the brakes, until it is opposed by a still higher pressure from the brake pipe. This perplexing situation ordinarily requires special attention and delay in reducing the excess pressure in one or more of the auxiliary reservoirs, so as to release the brakes which are energized by excess pressure from such reservoirs.

A general object of the invention is to overcome all of the foregoing problems in this old art.

More specifically stated, an object is to avoid the usual destructive conditions which occur when the switchmen, or other operators, fail to release the brakes from idle cars before they are placed in motion.

Another object is to overcome the waste of compressed air which often occurs when an ordinary operator releases compressed air from the emergency reservoirs, while merely attempting to release the brakes. This waste of compressed air from emergency reservoirs has no value in the expected task of releasing the brakes.

A further object is to dispose of the serious problems due to excessive pressure in auxiliary reservoirs when a train of cars is in service. This excessive pressure in auxiliary reservoirs has been a very perplexing problem, wherein the brakes were unintentionally applied to cars in moving trains, until the source of the trouble was eventually located and overcome by expert attention to details. Aside from the destructive effects of forcibly moving cars while their brakes are energized, the old conditions involve delay of trains, as well as the trouble and expense of locating the cars wherein there is excess pressure in the auxiliary reservoirs, and then manually releasing compressed air from the reservoirs.

In a desirable form of the invention, one or all of these old problems can be overcome by the cooperative effect of an automatic release valve device added to the standard air brake system. The present invention enables the experts in this art to retain all of their accepted standards, while merely adding a valve device which overcomes a number of their old problems.

With the foregoing and other objects in view, the invention comprises the combination and arrangement of details herein described to set forth one form of the invention. However, it is to be understood that the scope of the patent extends to variations and modifications described by terms of the claims hereunto appended.

Fig. 1 is a diagrammatical view illustrating a conventional air brake system equipped with a release valve device embodying features of this invention.

Fig. 2 is a simplified diagram illustrating an ordinary condition wherein compressed air from a brake pipe flows through a triple valve, or similar valve device, and thence to an auxiliary reservoir.

Fig. 3 is a view similar to Fig. 2, diagrammatically illustrating another ordinary condition wherein compressed air from the auxiliary reservoir is employed to energize the brakes.

Fig. 4 is a detail view on a larger scale, showing a release valve device which releases compressed air from the auxiliary reservoir and brake cylinder in response to a gradual release of the compressed air in the brake pipe.

The drawings do not include all of the many complex details of well known or "standard" air brake systems, but to understand the effects of the invention, one should bear in mind various ordinary conditions.

Ordinary air brake equipment

The ordinary air brake equipment now in general use on railway trains is, of course, well understood by those skilled in the art, so I do not deem it necessary to show or describe all of the details involved in the construction and operation of this old equipment.

However, as a simple reminder of conditions existing in an ordinary air brake system, I will briefly refer to the following:

The air is compressed by an air pump on the locomotive, and is stored in a tank termed the "main reservoir" on the locomotive or tender. Each car in the train is equipped with a pipe, known as a "brake pipe" connected to the main reservoir. However, the normal pressure in this main reservoir is relatively high (for example, 110 pounds per square inch), so a reducing valve is usually employed to provide a normal high pressure of 70 pounds in the brake pipes of freight cars. The pressure in the brake pipes is normally controlled by the engineer who operates valve devices which enable him to produce the normal pressure of 70 pounds through the reducing valve, or to increase the pressure by causing the main reservoir to communicate directly with the brake pipes, or to reduce the pressure in the brake pipes by causing them to communicate with the atmosphere.

Under ordinary operating conditions, the brakes on a train of cars are gradually applied in response to a gradual reduction in the air pressure in the brake pipes. This is known as a "service" application of the brakes, but a more sudden emergency stop can be made by suddenly eliminating practically all of the air pressure from the brake pipes, and this occurs when hand-operated valve devices are deliberately employed for the emergency stop, or when an accidental breaking apart of the train suddenly releases the air pressure from the brake pipes.

Triple valve

An auxiliary air reservoir is placed under each car to receive air at the same pressure as in the brake pipes. A primary automatic valve device known as a triple valve, or the improved "AB" triple valve device, connects the brake pipe, auxiliary reservoir and brake cylinder together in such a manner that reduction of pressure in the brake pipe opens a passage for the air from the auxiliary reservoir to the brake cylinder, thereby applying the brakes and closing the connection between the brake pipe and reservoir. To release the brakes, the pressure in the brake pipes is restored, thereby causing the triple valve device to close the connection between the auxiliary reservoir and brake cylinder, while allowing air to escape from the brake cylinder and opening a passageway from the brake pipe to the auxiliary reservoir.

The modern "AB" type of triple valve device provides for use of an emergency air reservoir under each car, and includes special additional automatic valves to utilize the additional supply of compressed air, but so far as the present invention is concerned, the term "triple valve" or "primary valve device" as employed in the specification and claims of this patent extend to all valves having the functions described under the above heading "Triple valve." Advantages of the invention are gained when the new device is employed with any of the usual types of triple valves, and special objections to the modern "AB" triple valve device are overcome by this improvement.

The present invention

Briefly stated, the present invention eliminates the trouble and expense, as well as the probability of errors ordinarily involved in requiring a person to move along a train of cars, from one car to another, while deliberately operating a release valve at each car to release all of the brakes. My own experience in this art has shown that the cost of these usual manual operations has been increased by the storage of compressed air in the emergency reservoir employed with the "AB" triple valve device.

The operator is expected to move the ordinary release valve device to an intermediate position, wherein it will merely discharge air from the auxiliary reservoir, so as to merely release the brakes, but in actual practice I have found that the trouble, expense and uncertainty of these manual operations usually result in a complete opening of the manually controlled release valve device, thereby idly discharging compressed air from the emergency reservoir, all of which results in the time, trouble and expense of again charging the emergency reservoir before the car is ready for normal service conditions.

Aside from elimination of the problems heretofore involved in requiring special personal attention to release valves on each car, and the automatic elimination of compressed air losses from emergency reservoirs of the AB type, the present invention overcomes the very old problem of disposing of overcharges of compressed air which often occur in auxiliary air reservoirs.

Fig. 1 of the drawings is a diagrammatical illustration of an air brake system for a railroad car including a brake pipe 5 having angle cocks 6 and hose connections 7 at its ends, so that the brake pipe may be coupled to similar pipes in other cars. As suggested at the left of Fig. 1, the brake pipes lead to a main air reservoir and control valves at a locomotive. In actual practice, the engineer of a freight train will operate valves to maintain a pressure of about 70 pounds per square inch in the brake pipe. To make a service stop, the engineer will gradually reduce the pressure in the brake pipe, thereby gradually applying the brakes. To make a sudden emergency stop, he will suddenly release all of the compressed air from the brake pipe 5, and a similar condition occurs when a hose connection 7 of one car is accidentally disconnected from the main reservoir at the locomotive.

The brake pipe 5 has a branch 8, provided with a normally open valve 9 leading to a housing 10 which may contain the usual triple valve, the improved "AB" triple valve device, or any other suitable arrangement of automatic valve devices to control the brakes.

Compressed air from the brake pipe 5 may be stored in an auxiliary reservoir 11 and also in an emergency reservoir 12. A partition 13 is secured between these reservoirs. A pipe 14 leads from the valve housing 10 to the emergency reservoir 12, and a separate pipe 15' connects the auxiliary reservoir 11 to said valve housing 10. Another pipe 16 leads from the valve housing 10 to a brake cylinder 17 containing a piston 18 from which pressure is transmitted to the brakes. A release spring 19 is located in the brake cylinder to return the piston and thereby release the brakes when air pressure is exhausted from the pipe 16.

These details of Fig. 1 are merely ordinary conditions, well understood in this art, and it may be unnecessary to add any specific description of details in the conventional valve device at the housing 10. However, to illustrate conditions involved in the present invention, Fig. 2 and Fig. 3 include diagrammatical views of a service piston 20 located in said housing 10, and arrows to indicate the flow of compressed air from the brake pipe to the auxiliary reservoir and brake cylinder. The piston 20 is movable in a chamber 21 and it has a stem 22 connected to slide valve devices including a valve member 23 shown in Fig. 3. The chamber 21 is provided with a groove 24, and the piston may be located at said groove, as shown in Fig. 2, so as to provide for a flow of air in the directions indicated by arrows in Fig. 2. Under these conditions, compressed air from the brake pipe 5 is transmitted through the groove 24 to a chamber at the right of the piston 20, and thence through a passageway 25 to the pipe 15' which leads to the auxiliary reservoir. Compressed air is thus transmitted from the brake pipe to the auxiliary reservoir, so as to establish one of the normal conditions wherein the pressure in the auxiliary reservoir is the same as the pressure in the brake pipe.

To apply the brakes, the pressure in the brake pipes is reduced, thereby causing a flow of air from the auxiliary reservoir to the right side of the piston 20, with the result of moving said piston to the position shown in Fig. 3, where it is forced into contact with a gasket 26. This closes communication between the auxiliary reservoir and brake pipe, while moving the valve member 23 to its open position shown in Fig. 3. Compressed air from the auxiliary reservoir is then transmitted in the directions indicated by arrows in Fig. 3, so as to energize the brakes. This air from the auxiliary reservoir flows through the valve member 23 in Fig. 3, to a passageway 27 and then to the pipe 16 leading to the brake cylinder 17.

The engineer will ordinarily release the brakes by increasing the pressure in the brake pipe 5, so as to restore the service piston valve 20 to the position indicated in Fig. 2. In the well known types of triple valves, or the like, this return movement of the service piston valve 20 will also operate a valve element (not shown) to exhaust compressed air from the brake cylinder, thereby releasing the brakes.

It is to be understood that the engineer, or other operator, can make a gradual service stop by intermittently releasing air pressure from the brake pipe, and that an operator can deliberately make a sudden emergency stop by suddenly exhausting the compressed air from the brake pipe. Furthermore, when one car in a train is accidentally uncoupled from another car, the compressed air in the brake pipes will be suddenly released, so as to automatically produce a sudden emergency application of the brakes.

The present invention comprises an automatic release valve device to automatically release the brakes in response to gradual release of the compressed air in the brake pipe. Bear in mind that the conventional valve equipment employed by the engineer requires an increase in the brake pipe pressure to release the brakes, and that the new device is designed to automatically release the brakes in response to decreases in said pressure.

However, the new automatic valve device does not become effective during the usual service stops wherein air pressure in the brake pipe is intermittently, or gradually, reduced. In other words, the improvement enables the engineer to continue the usual practice in making service stops and emergency stops, and it does not interfere with the usual functions of the standard air brake equipment.

To illustrate one form of the invention, I have shown a valve chamber 28 (Fig. 1 and Fig. 4) containing a release valve 29 and a spring 30 to normally retain said release valve in its closed position. A pipe 31 connects the valve chamber 28 to the pipe 15', so the normal air pressure in the auxiliary reservoir will also tend to retain the release valve 29 in its closed position. Said valve 29 is provided with a stem 32 adapted to be engaged by a release lever 33 located in a housing 34 and pivotally supported at 35. The housing 34 may be provided with a screen or filter 36 as shown in Fig. 4 for the discharge of air to the atmosphere.

In this form of the invention, a spring 37 is associated with the lever 33, as shown in Fig. 4, and the pressure of said spring may be transmitted through said lever 33 to open the release valve 29. The spring pressure tends to open the release valve, but under normal operating conditions, the force of the spring is overcome by a suitable pressure-responsive control device exposed to the pressure of compressed air in the brake pipe.

Fig. 4 illustrates a suitable pressure-responsive control device including a cylinder 38 having heads 39 and 40, and a control member in the form of a piston 41 located adjacent to the head 39. The piston is normally exposed to air pressure which forces it into contact with a gasket 42 at the head 39, and this head is provided with a port 43, as shown in Fig. 4. An operating stem 44 extends from the control piston 41 and contacts with the lever 33, so as to normally retain the release valve 29 in its closed position. The stem 44 may be surrounded by a supplemental spring 45 tending to move the piston 41 to the left from the position shown in Fig. 4. A stop member 46 is located in the cylinder 38 to limit the movement of the piston 41 when it is actuated by the springs 37 and 45.

Any suitable means may be employed to transmit compressed air from the brake pipe 5 to the control piston 41. For example, a pipe 47 may connect the cylinder 38 to the branch 8 of the brake pipe, as shown in Figures 1 and 4, so as to normally expose the piston 41 to the air pressure in said brake pipe.

At this point, it should be understood the usual brake pipe pressures are high enough to retain the control piston 41 in the position shown in Fig. 4, thereby retaining the release valve 29 in its closed position. The usual service applications of the brakes are due to reductions of pressure in the brake pipe, but these usual reduced pressures are high enough to retain the piston 41 in the position shown in Fig. 4. However, when the air pressure in the brake pipe is gradually exhausted, the pressure of the springs 37 and 45 will force the piston 41 to the left from the position shown in Fig. 4, at the same time moving the lever 33 to open the release valve 29. When this occurs, compressed air from the auxiliary reservoir and brake cylinder will be exhausted at the release valve 29 to release the brakes.

Fig. 3 diagrammatically shows how the triple valve device can be positioned to place the auxiliary reservoir in communication with the brake cylinder in response to relatively low pressures in the brake pipe, and Fig. 1 shows that the release valve chamber 28 is connected to a pipe 31 which then communicates with the brake cylinder and auxiliary reservoir. Consequently, when the supply of compressed air in the brake pipe 5 is gradually exhausted, the release valve 29 (Fig. 4) will be located in its open position, so as to exhaust the compressed air from the brake cylinder, and thereby release the brakes.

*Emergency conditions*

In the preferred form of the invention, I employ an emergency device to prevent release of the brakes in response to an emergency stop, which involves a sudden release of the compressed air in the brake pipe. This is an important factor, as the emergency condition is intended to quickly overcome the momentum of a moving train of cars and positively retain each car in a fixed position.

I have shown how the release valve 29 can be automatically opened to automatically release the brakes in response to a gradual release of the compressed air in the brake pipe, and I will now refer to an emergency device which prevents release of the brakes in response to a sudden release of said compressed air.

Briefly stated, this emergency device comprises an emergency valve which automatically closes communication between the brake pipe 5 and the release valve device when the pressure in the brake pipe is suddenly exhausted. Fig. 4 illustrates a suitable type of this emergency valve associated with the release valve device, and without limiting the patent to specific details in this view, I will now describe the emergency valve device therein shown.

48 designates an emergency valve in the form of a piston slidable in the cylinder 38, where it is confined between the stop member 46 and a gasket 49 at the cylinder head 40. This piston 48 has a stem 50 surrounded by a spring 51 which normally retains said piston 48 in contact with the stop 46. The cylinder 38 has an internal groove, or port 52, which normally provides for a flow of air across the periphery of the piston, as shown in Fig. 4. The cylinder head 40 has an extension 53 coupled to the pipe 47 and provided with ports 54 to maintain said pipe 47 in free communication with the left side of the piston valve 48.

Under normal operating conditions, the pressure in the brake pipe will be transmitted through the groove 52 (Fig. 4) to an air chamber A between the pistons 41 and 48, thereby subjecting the left side of piston 41 to the usual pressures, while equalizing the pressure at opposite sides of the piston 48. Relatively slight reductions of pressure in the brake pipe will result in corresponding variations of pressure in chamber A without displacing either of the pistons 41 or 48. In other words, the usual service applications of the brakes will not displace said pistons. Consequently, the automatic release valve device does not in any way interfere with the usual train operations wherein the pressure in the brake pipe is frequently varied to apply and release the brakes.

A source of compressed air is constantly maintained in the air chamber A between the pistons 41 and 48, and when an additional volume of such compressed air is desired, the air chamber A may be connected to a supplemental chamber B, as shown in Fig. 4, so as to provide excess compressed air to be employed in an emergency when the air pressure in the brake pipe is suddenly exhausted. It is to be understood that a sudden elimination of compressed air from the brake pipe will result in relatively high pressure at the right hand side of the piston 48 in Fig. 4, so as to suddenly move said piston 48 into contact with the gasket 49 at the cylinder head 40, thereby trapping compressed air in the chamber A, so as to retain the piston 41 in the position shown in Fig. 4. This sudden release of pressure from the brake pipes, due to an emergency application of the brakes, will not open the release valve 29.

When the train arrives at a terminal where the brakes on each car are to be released, the engineer merely exhausts air from the brake pipe at a service rate. On long trains, to save time, some of the compressed air in the brake pipe may be exhausted through the usual conductor's valve, while avoiding a reduction of pressure faster than a service rate.

When the air pressure is thus gradually released from the air chambers A and B, through the groove or port 52 in Fig. 4, the springs 37 and 45 will force the piston 41 into contact with the stop 46, at the same time moving the operating lever 33 to open the release valve 29, thereby releasing compressed air from the brake cylinder to the atmosphere, so as to release the brakes. During this gradual release of compressed air from the brake pipe, the emergency piston valve 48 will remain in the open position shown in Fig. 4.

This automatic release of compressed air from the brake cylinder and auxiliary reservoir does not disturb the reserve supply of compressed air in the emergency reservoir 12 (Fig. 1) of the so called "AB" equipment.

The usual manual operations of special release valves on each car involves the time and expense of attention to such manual operations, as well as accidental release of the reserve supply of compressed air in emergency reservoirs. The present invention eliminates all of this expense, and overcomes the destructive effects of starting idle cars wherein the workman failed to operate the manually controlled release valve devices. The invention also saves time in recharging the air brake equipment.

In an emergency application of the brakes, the compressed air from chamber A in Fig. 4 will be restricted by a gradual flow through the groove or port 52, so as to provide a relatively high pressure in the chamber A, which moves the piston valve 48 into contact with the gasket 49. Compressed air is thus trapped in the chambers A and B, so as to provide a reserve pressure on the piston 41, and thereby prevent automatic release of the brakes when the compressed air is suddenly exhausted from the brake pipes.

I have previously referred to perplexing problems involved in trying to eliminate excess pressure from one or more auxiliary reservoirs while the engineer is faced with the task of avoiding delay in moving a train of cars. Such excess pressure results in a condition suggested by Fig. 3 while the train of cars is in motion, the pressure in the auxiliary reservoir being higher than the normal high pressure in the brake pipe. In this event, the normal high pressure from the brake pipe will fail to release the brakes of a car wherein there is excess pressure in the auxiliary reservoir.

However, the present invention provides an immediate solution of this old problem, as the engineer can gradually release the compressed air from the brake pipes, thereby gradually releasing the compressed air from the air chamber A in Fig. 4, so as to open the release valve 29 which results in release of compressed air from the auxiliary reservoir. This eliminates the trouble, expense and delays ordinarily involved in trying to locate the car or cars having excess pressure, or in manual release valve operations which are likely to completely exhaust the reserve compressed air from all of the auxiliary and emergency reservoirs in an entire train. The present invention enables the engineer to quickly overcome the whole problem by merely discharging compressed air from the brake pipes, without releasing any of the reserve air supply in the emergency reservoirs.

In the specific combination and arrangement of details herein shown, the cross-sectional area of the port 52 in Fig. 4 is preferably larger than that of the similar port 24 in Fig. 2, so as to provide for relatively free transmission of air pressure from the brake pipe to the piston 41.

I claim:

1. In an air brake system for a railroad car wherein gradual reduction of air pressure in a brake pipe results in transmission of air pressure from an auxiliary reservoir to a brake cylinder to apply the brakes, the improvement which comprises a release valve device to automatically release the brakes in response to continued release of air pressure from the brake pipe, said release valve device including a check valve to exhaust air from said auxiliary reservoir, said check valve being normally closed in response to pressure from said auxiliary reservoir, and a pressure-responsive control member controlling the movements of said valve, said pressure responsive control member being exposed to the normal air pressures in said brake pipe, so as to retain said check valve in its closed position during the normal service pressures in said brake pipe, and said check valve being movable to its open position in response to said continued release of pressure from the brake pipe.

2. In an air brake system for a railroad car equipped with a brake cylinder, an auxiliary air reservoir, a brake pipe for the delivery of compressed air to said auxiliary reservoir and brake cylinder, and an arrangement of automatic valves through which air pressure is transmitted from said brake pipe to said reservoir and brake cylinder, said automatic valves including a valve device through which air pressure is transmitted from said reservoir to said brake cylinder in response to a decrease of pressure in said brake pipe so as to energize the brakes, the improvement in said air brake system which comprises an automatic release valve device to release the air pressure in said auxiliary reservoir and thereby release the brakes, said automatic release valve device including a normally closed check valve forced onto its seat by pressure from said auxiliary reservoir, an air chamber communicating with said brake pipe, and controlling devices for said check valve including a piston slidable in said air chamber to open the check valve, said piston being exposed to normal air pressures in said brake pipe and air chamber, so as to normally retain said check valve in its closed position.

3. In an air brake system for a railroad car wherein gradual reduction of air pressure in a brake pipe results in transmission of compressed air from a reservoir to a brake cylinder to apply the brakes, the improvement which comprises an automatic release valve device to automatically release the brakes in response to continued release of air pressure from the brake pipe, said automatic release valve device including a normally closed release valve movable to release air from the said reservoir, a spring tending to retain said release valve in its closed position, a second spring device tending to open said release valve, and a pressure-responsive control member opposing said second spring device to normally retain the release valve in its closed position, said pressure-responsive control member being exposed to normal air pressures in said brake pipe and movable to automatically release the brakes in response to said continued release of pressure from the brake pipe.

4. In an air brake system for a railroad car wherein gradual reduction of air pressure in a brake pipe results in transmission of compressed air from a reservoir to a brake cylinder to apply the brakes, said system including a primary valve device to normally release the brakes in response to relatively high air pressure in the brake pipe, the improvement which comprises an automatic release valve device to automatically release the brakes in response to continued release of air pressure from the brake pipe, said automatic release valve device including a normally closed release valve movable to exhaust air from said reservoir, a spring device tending to open said release valve, and a pressure-responsive control member comprising a slidable piston opposing said spring device to normally retain said release valve in its closed position, said slidable piston being exposed to normal air pressures in said brake pipe and movable to automatically release said spring device in response to said continued release of pressure from the brake pipe.

5. In an air brake system for a railroad car wherein gradual reduction of air pressure in a brake pipe results in transmission of compressed air from a reservoir to a brake cylinder to apply the brakes, the improvement which comprises an automatic release valve device to automatically release the brakes in responsive to continued release of air pressure from the brake pipe, said automatic release valve device including a valve chamber communicating with said reservoir and having an exhaust port communicating with the atmosphere, a normally closed release valve seated at said exhaust port and movable to release air from said reservoir to the atmosphere, a spring device to open said release valve, and a pressure-responsive control member opposing said spring device to normally retain the release valve in its closed position, said pressure-responsive control member including a slidable piston having one side normally exposed to air pressures in said brake pipe, so as to overcome said spring device in response to normal pressures in the brake pipe, the opposite side of said piston being exposed to atmospheric pressure.

6. In an air brake system for a railroad car wherein gradual reduction of air pressure in a brake pipe results in transmission of compressed air from a reservoir to a brake cylinder to apply the brakes, said system including a primary valve device to normally release the brakes in response to relatively high air pressure in the brake pipe, the improvement which comprises an automatic release valve device to automatically release the brakes in response to continued release of air pressure from the brake pipe, said automatic release valve device including a normally closed release valve movable to release air from said reservoir, a spring actuated lever to open said release valve, and a pressure-responsive control member opposing said spring actuated lever to normally retain the release valve in its closed position, said pressure-responsive control member including a slidable piston exposed to normal air pressures in said brake pipe, so as to overcome said spring actuated lever in response to normal pressures in the brake pipe, and spring actuated lever being released to open said release valve when the air pressure at said slidable piston fails to overcome the spring actuated lever.

7. In an air brake system for a railroad car wherein gradual reduction of air pressure in a brake pipe results in transmission of air pressure from a reservoir to a brake cylinder to apply the brakes, the improvement which comprises an automatic release valve device arranged to automatically release the brakes in response to continued release of air pressure from the brake pipe, said automatic release valve device including a normally closed release valve movable to exhaust air from said reservoir, and a valve opening device having a pressure-responsive control member normally exposed to air pressures in said brake pipe and movable to open said release valve in response to said continued release of air pressure from the brake pipe, and an automatic emergency valve to close communication between said brake pipe and the pressure-responsive control member, said emergency valve being normally open but movable to its closed position in response to a sudden reduction of pressure in the brake pipe.

8. In an air brake system for a railroad car wherein reduction of air pressure in a brake pipe results in transmission of air pressure from an auxiliary reservoir to a brake cylinder to apply the brakes, the improvement which comprises a release valve device to automatically release the brakes in response to release of air pressure from the brake pipe, said release valve device including a release valve to exhaust air from said auxiliary reservoir, a pressure-responsive control member controlling the movements of said release valve, said pressure-responsive control member being normally exposed to air pressures in said brake pipe, so as to retain said release valve in its closed position during the normal service pressures in said brake pipe, said control member being movable to open said release valve in response to gradual release of pressure from the brake pipe, and means for preventing release of the brakes in response to a sudden release of the pressure in said brake pipe, said means including an emergency valve between the brake pipe and said pressure-responsive control member.

9. In an air brake system for a railroad car equipped with a brake cylinder, an auxiliary air reservoir, a brake pipe for the delivery of compressed air to said auxiliary reservoir and brake cylinder, and an arrangement of automatic valves through which air pressure is transmitted from said brake pipe to said reservoir and brake cylinder, said automatic valves including a valve device through which air pressure is transmitted from said reservoir to said brake cylinder in response to a decrease of pressure in said brake pipe so as to energize the brakes, the improvement in said air brake system which comprises an automatic release valve device to release the air pressure in said auxiliary reservoir and thereby release the brakes, said automatic release valve device including a normally closed release valve, an air chamber communicating with said brake pipe, and controlling devices for said release valve including a piston slidable in said air chamber to open the release valve in response to gradual release of pressure from the brake pipe, said piston being exposed to normal air pressures in said brake pipe and air chamber, an emergency valve controlling communication between said brake pipe and air chamber, and a spring to hold said emergency valve in its open position, said emergency valve being movable to its closed position in response to a sudden discharge of air from said air chamber to said brake pipe.

10. In an air brake system for a railroad car wherein gradual reduction of air pressure in a brake pipe results in transmission of compressed air from a reservoir to a brake cylinder to apply the brakes, the improvement which comprises an automatic release valve device to automatically release the brakes in response to continued gradual release of air pressure from the brake pipe, said automatic release valve device including a normally closed release valve movable to release air from the said reservoir, a spring device tending to open said release valve, a pressure-responsive control member opposing said spring device to normally retain the release valve in its closed position, said pressure-responsive control member being exposed to normal air pressures in said brake pipe and movable to automatically open said release valve in response to said continued gradual release of pressure from the brake pipe, and an emergency valve between said brake pipe and the pressure-responsive control member, said emergency valve being normally open but movable to its closed position in response to a sudden release of the compressed air in said brake pipe.

11. In an air brake system for a railroad car wherein gradual reduction of air pressure in a brake pipe results in transmission of compressed air from a reservoir to apply the brakes, the improvement which comprises an automatic release valve device to automatically release the brakes in response to continued gradual release of air pressure from the brake pipe, said automatic release valve device including a normally closed release valve to release air from said reservoir, a spring device tending to open said release valve, a pressure-responsive control member opposing said spring device to normally retain the release valve in its closed position, said pressure-responsive control member including a slidable piston normally exposed to air pressures in said brake pipe, so as to overcome said spring device in response to normal pressures in the brake pipe, and an emergency valve in the form of a piston between said brake pipe and the pressure-responsive control member, said emergency valve being exposed to normal pressures in said brake pipe and movable to its closed position in response to a sudden release of the compressed air from the brake pipe.

CHARLES E. STRODE.